(12) United States Patent
Holcomb et al.

(10) Patent No.: US 7,080,454 B2
(45) Date of Patent: Jul. 25, 2006

(54) DEVICES AND METHODS FOR USE IN PREPARING CERTAIN FRUITS FOR CONSUMPTION

(75) Inventors: David A. Holcomb, Seattle, WA (US); Joshua R. Stewart, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 63 days.

(21) Appl. No.: 10/710,407

(22) Filed: Jul. 8, 2004

(65) Prior Publication Data

US 2006/0005400 A1 Jan. 12, 2006

(51) Int. Cl.
*A47J 17/00* (2006.01)
*A47J 25/00* (2006.01)

(52) U.S. Cl. .............................. 30/114; 30/117; 30/302; 30/303; 99/541

(58) Field of Classification Search .............. 30/113.1, 30/114, 301, 302, 303, 279.2, 279.4, 279.6, 30/280; 99/540, 541, 545; D7/673, 693
See application file for complete search history.

(56) References Cited

U.S. PATENT DOCUMENTS

| | | | |
|---|---|---|---|
| 924,124 A * | 6/1909 | Worcester | 172/376 |
| 1,483,676 A | 2/1924 | Petersen | 30/279.6 |
| 1,716,841 A * | 6/1929 | Stone | 172/376 |
| 2,188,020 A * | 1/1940 | Tewell | 30/121.5 |
| 2,321,725 A * | 6/1943 | Alderfer | 30/114 |
| 4,383,367 A * | 5/1983 | Mielnicki | 30/114 |
| 5,533,442 A | 7/1996 | Tateno | 99/541 |
| 5,613,431 A | 3/1997 | Tateno | 99/541 |
| 5,937,524 A * | 8/1999 | Hornsby | 30/113.1 |
| D488,360 S * | 4/2004 | Young | D7/693 |
| 6,796,032 B1 * | 9/2004 | Horng | 30/114 |
| D507,726 S * | 7/2005 | Holcomb et al. | D7/693 |
| 2004/0117989 A1 | 6/2004 | Horng | 30/114 |

* cited by examiner

*Primary Examiner*—Hwei-Siu C. Payer
(74) *Attorney, Agent, or Firm*—Seed IP Law Group PLLC

(57) ABSTRACT

Devices for removing and/or slicing a meat of fruit are disclosed. In one embodiment, the device has a handle portion and a working portion having an elongated blade and a pair of lateral extensions. The elongated blade has a cross-sectional shape adapted to facilitate movement of the elongated blade through the meat of the fruit. The working portion of the device has a resting configuration in which the elongated blade has a first radius of curvature, and at least one of the lateral extensions is manipulable under a manual force during use to deform the working portion from the resting configuration to a displaced configuration in which the elongated blade has a second radius of curvature, selectively conforming to the curvature of the skin before and as the elongated blade moves through the meat of the fruit.

22 Claims, 5 Drawing Sheets

DEVICES AND METHODS FOR USE IN PREPARING CERTAIN FRUITS FOR CONSUMPTION

BACKGROUND OF INVENTION

1. Field of the Invention

This invention relates to devices and methods for removing the skin from a piece of soft fruit, and/or for slicing the meat of the fruit.

2. Description of the Related Art

Traditionally, the meat of certain soft fruit, such as an avocado, papaya or the like, is removed from the skin by cutting the fruit into two halves, separating the two halves from each other, removing the pit or seeds from one or both halves, and either scooping the meat out of the skin with a spoon or peeling the skin away from the meat. Scooping the meat out of the skin is effective, but tends to result in the meat being removed in misshapen or even mutilated pieces. As a result, although the process suffices for making guacamole or chutney, it isn't particularly suited for preparing slices for consumption or for use in sandwiches, hamburger, sushi or other dishes where appearance is important.

Where appearance is important, the skin is typically peeled from the meat, either before or after the meat is sliced. As a result, the slices of fruit can be presented with a consistent and appetizing appearance. Manually cutting, peeling and slicing fruit, however, can be a messy and time-consuming project.

SUMMARY OF INVENTION

The present invention is directed toward devices for removing the meat from a piece of soft fruit, such as an avocado, papaya or the like, and/or for slicing the meat. In one particular embodiment, the device has a handle portion adapted to allow an individual to manually manipulate the device, and a working portion having an elongated blade and a pair of lateral extensions coupling opposing ends of the elongated blade to the handle portion. The elongated blade has a cross-sectional shape adapted to facilitate movement of the elongated blade through the meat of the fruit. The working portion of the device has a resting configuration in which the elongated blade has a first radius of curvature, and at least one of the lateral extensions is manipulable under a manual force during use to deform the working portion from the resting configuration to a displaced configuration in which the elongated blade has a second radius of curvature, to allow the individual to adjust the curvature of the elongated blade to conform it to the curvature or size of the fruit before and as the elongated blade moves through the meat of the fruit. The working portion of the devices comprises a resilient material such that, when the manual force is removed from the at least one lateral extension, the working portion automatically returns to the resting configuration.

The present invention is also directed toward methods for removing the meat from a piece of fruit, and/or for slicing the meat. In one particular embodiment, the method incorporates providing a device having a handle portion, a working portion and a coupling portion positioned between the handle portion and the working portion; retaining the handle portion with one hand and the piece of fruit with the other hand; and moving the working portion in a cutting direction through the meat of the piece of fruit proximate the skin while simultaneously squeezing the coupling portion laterally with respect to the cutting direction to deform the working portion to conform to the shape of the skin of the piece of fruit as it moves through the meat.

The present invention is also directed toward variants thereof and other embodiments of devices and methods for removing fruit from the skin and/or slicing the fruit equivalent thereto.

DETAILED DESCRIPTION

Figure 1:
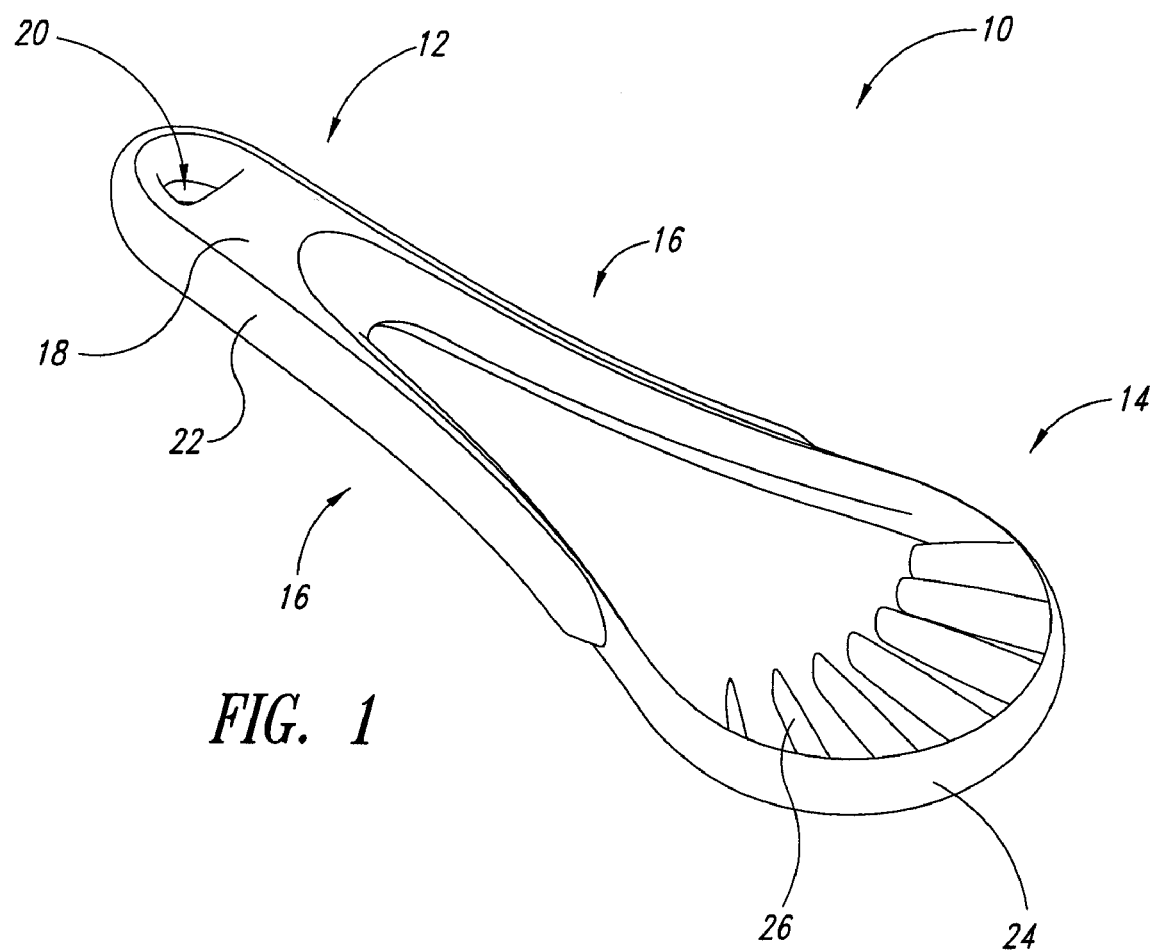
FIG. 1 is an isometric view of a device for removing the meat from a piece of fruit, according to an embodiment of the present invention.

The present detailed description is directed toward devices and methods for removing the meat from a piece of soft fruit, such as avocado, papaya or the like, and/or for slicing the meat. The invention could take on other embodiments, and one of ordinary skill in the art, having reviewed the present disclosure and corresponding drawings in their entireties, would readily appreciate modifications that could be made to the illustrated embodiments without deviating from the spirit of the invention. Thus the invention is not to be limited to the specific embodiments illustrated in the drawings and described in connection therewith.

Figure 2:
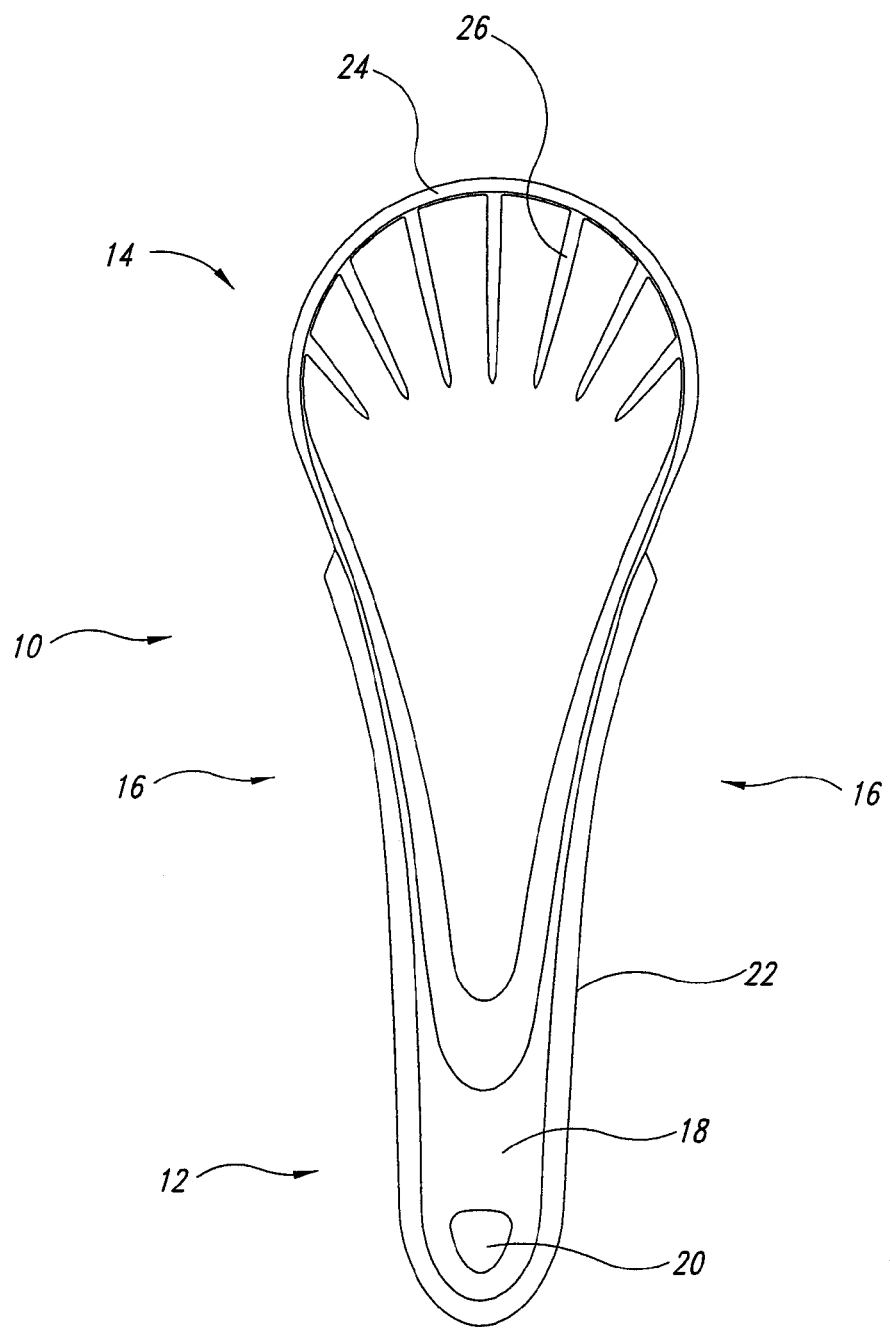
FIG. 2 is a plan view of the device of FIG. 1.
Figure 3:
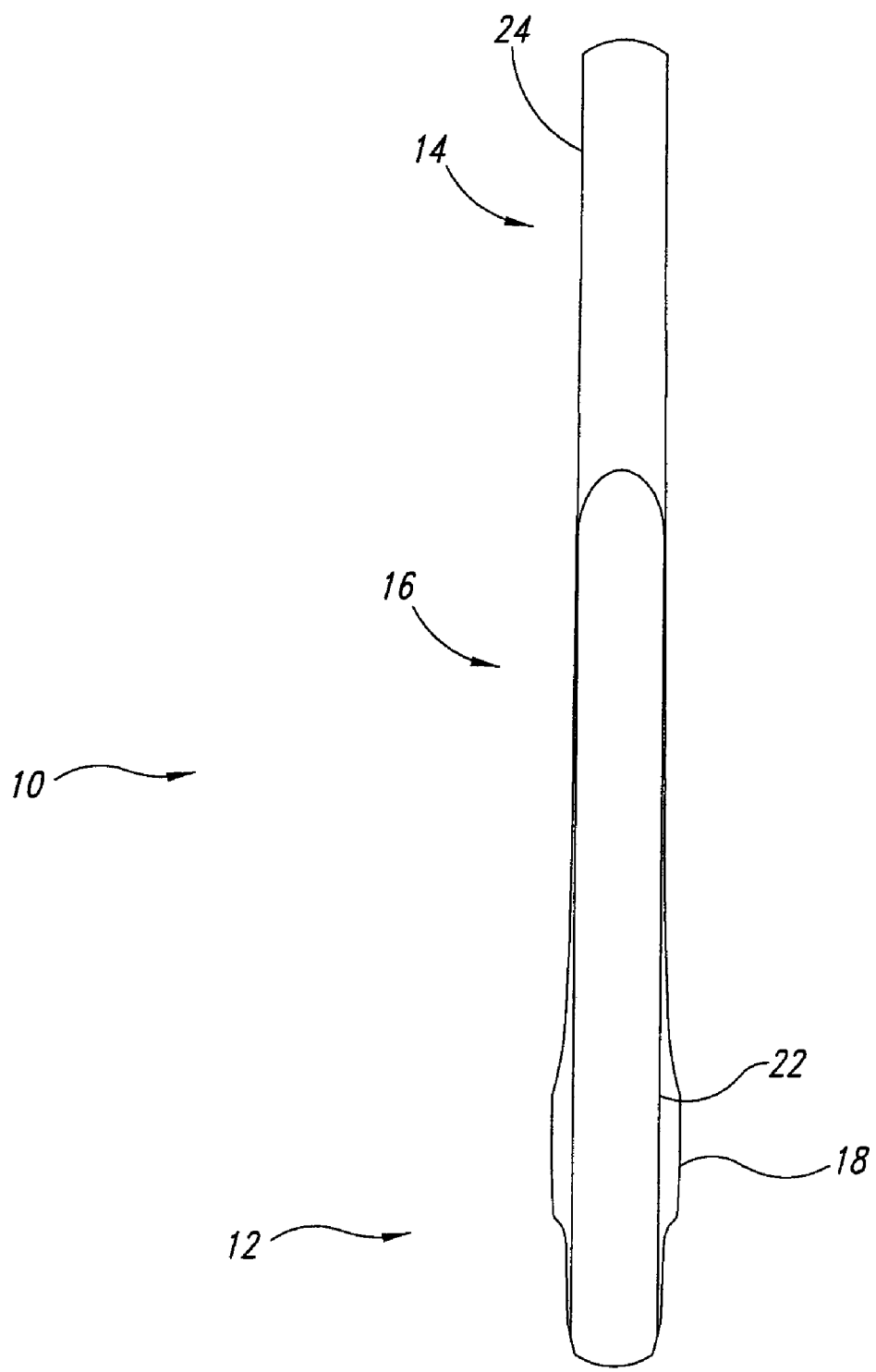
FIG. 3 is a side view of the device of FIG. 1.

FIGS. 1–3 illustrate one particular embodiment of a device for scooping the meat from an avocado, and for simultaneously slicing the meat. The device 10 can have a body that is unitary in construction or that is assembled, and generally has a handle portion 12, a working end 14 and a pair of lateral extensions 16. The handle portion 12 in the illustrated embodiment has a core 18 with an opening 20 therethrough for storage, and which is partially surrounded by a resilient grip 22. The handle portion 12 is sized and shaped to facilitate being held and manipulated by an individual using one hand. The portion of the core 18 at the handle portion 12 of the device 10 can be rigid. The opening 20 can be sized and shaped to receive a hook or other structure (not shown) for hanging the device 10 between uses. The grip 22 can be positioned to cover two or more or fewer surfaces of the handle portion 12, to facilitate gripping of the device 10 by a user. In the illustrated embodiment, the grip 22 extends in a single strip around the edge of the handle portion 12 of the device 10, from one lateral extension 16 to the opposite lateral extension.

The illustrated core 18 is formed along with the working end 14 and the lateral extensions 16 from a single piece of material; however, an individual of ordinary skill in the art, having reviewed this entire disclosure and the corresponding figures, would appreciate that different constructions, including two, three or more assembled parts, could instead be used without deviating from the spirit of the invention.

The working end 14 incorporates a blade 24 and several teeth 26. The blade 24 extends along a generally arcuate path between the lateral extensions 16. In the illustrated embodiment, the curvature of the blade 24 in the relaxed configuration (i.e., when the device 10 is not being manipulated) is sized and shaped to generally conform to the girth at the waist of a large avocado. The inventors appreciate, however, that the device 10 can be made in different sizes to more closely conform to the different possible sizes of avocados.

The blade 24 is adapted to pass through the meat of an avocado relatively easily. For example, the blade 24 can have a generally wing-shaped cross-section, terminating at the leading and/or trailing edges in an acute wedge and a tapered point. One or both of the edges could be sharpened. Between the edges, one surface of the blade can be generally flat and one of the surfaces can follow a convex curve. Instead, the blade could be wide and flat, with thin but blunt edges. An individual of ordinary skill in the art, having reviewed this entire disclosure and the corresponding figures, will appreciate the variety of shapes and details that can be incorporated into the design of the blade 24 without deviating from the spirit of the invention.

The blade 24 is designed to be sufficiently flexible such that the degree of curvature of the blade can be manually increased or decreased, and to be sufficiently resilient such that the blade will return to its original shape when the bending force is removed. Depending on the material used for the blade 24—be it plastic, nylon, metal, or other suitable materials—the width, thickness and shape of the blade are selected to meet these criteria.

The teeth 26 are spaced apart from each other and extend inwardly from an inner surface of the blade 24 along generally radial paths. Similar to the blade 24, the teeth 26 are sized and shaped to pass easily through the meat of the avocado. In the illustrated embodiment, the teeth 26 are manufactured integrally with the blade 24, such as through injection molding; however, the teeth could instead be separate pieces attached to the blade by known means. The ends of the illustrated teeth 26 opposite the blade 24 are free, allowing the teeth to move freely towards and away from each other as the device 10 is manipulated. The teeth 26 are sufficiently long to cut the entire thickness of a portion of avocado as the device 10 passes through the meat.

In the illustrated embodiment, the device 10 has seven teeth 26, to cut half an avocado into eight roughly equal sections; however, the number and spacing—and even the existence—of the teeth can be changed as desired.

The lateral extensions 16 connect the handle portion 12 and the blade 24, and are positioned to be manipulated by the user, for example, between the user's thumb and forefinger. In the illustrated embodiment, the lateral extensions 16 literally are merely extensions of the blade 24; however, in other embodiments, the ends of the blade could instead be bonded or otherwise coupled to the lateral extensions. The lateral extensions 16 need not be flexible or resilient; they could instead be pivotally coupled or otherwise attached to the handle portion 12, so long as manipulation of the lateral extensions resulted in bending of the blade 24. One of ordinary skill in the art, having reviewed this entire disclosure and the corresponding figures, will appreciate other variations that could be made to the device 10 without deviating from the spirit of the invention.

In the illustrated embodiment, the grip 22 covers the portions of the lateral extensions 16 that will be manipulated by the user. In other embodiments, the lateral extensions 16 can instead by formed, machined, coated or otherwise adapted to provide the user with a secure grip of the device 10 for manipulation. Likewise, the device 10 could be made with no grip.

Figure 4:
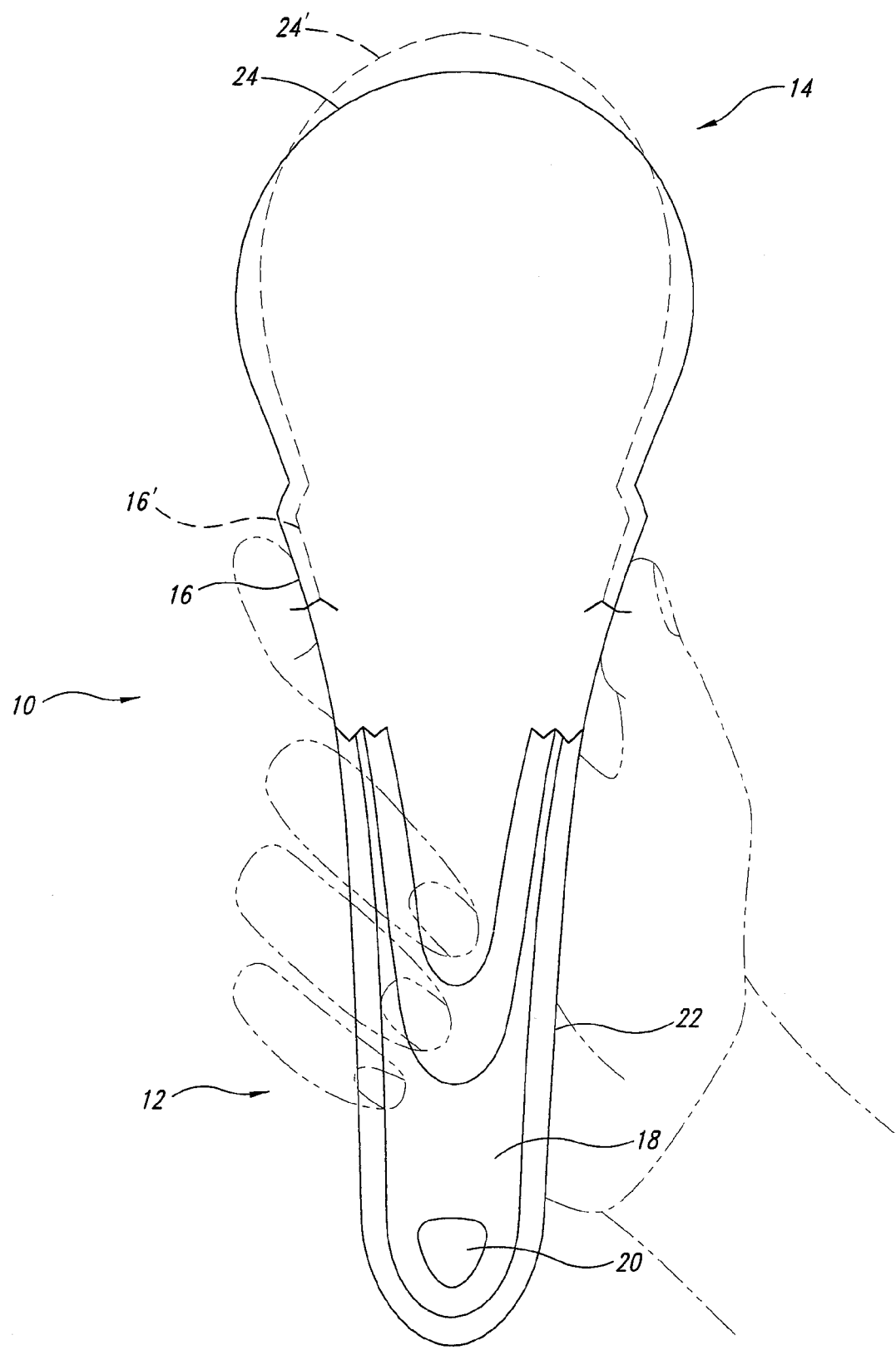
FIG. 4 is a schematic plan view of the device of FIG. 1 in a resting configuration, superimposed by a partial plan view of the device of FIG. 1 in a deformed configuration.

FIG. 4 schematically illustrates two possible configurations of the device 10. The lateral extension 16 and blade 24 shown in solid lines reflect the curvature of this particular device 10 when the user is not manipulating the device. As indicated above, this size, shape and/or curvature can be selected to correspond to a large avocado. The lateral extension 16' and blade 24' shown in broken lines reflect the curvature of this particular device 10 when the user is depressing the lateral extensions. The blade 24' at the extreme working end 14 has a tighter curve—or smaller radius of curvature if it can be assumed to be at least partially arcuate in shape—than the original blade 24. This shape can correspond to a smaller avocado or to the neck portion of the large avocado. The device 10 may be squeezed harder or softer to create different curvatures. Thus, by merely manipulating the device 10 manually during use, the same device can be used to remove the meat from an entire avocado (from top to bottom) and can be used to remove the meat from avocados of different sizes. Because the material of the invention is resilient, as the size of the avocado increases, the user merely relaxes and the size of the device 10 also increases.

Embodiments of the present invention can have many advantages over devices and methods of the prior art. For example, the device can quickly skin and/or neatly slice avocado without making a big mess, leaving sliced avocado that can not only be used in guacamole, but could also be presented for use in sandwiches or other meals. These and other advantages may be appreciated by practicing the present invention.

Figure 5:
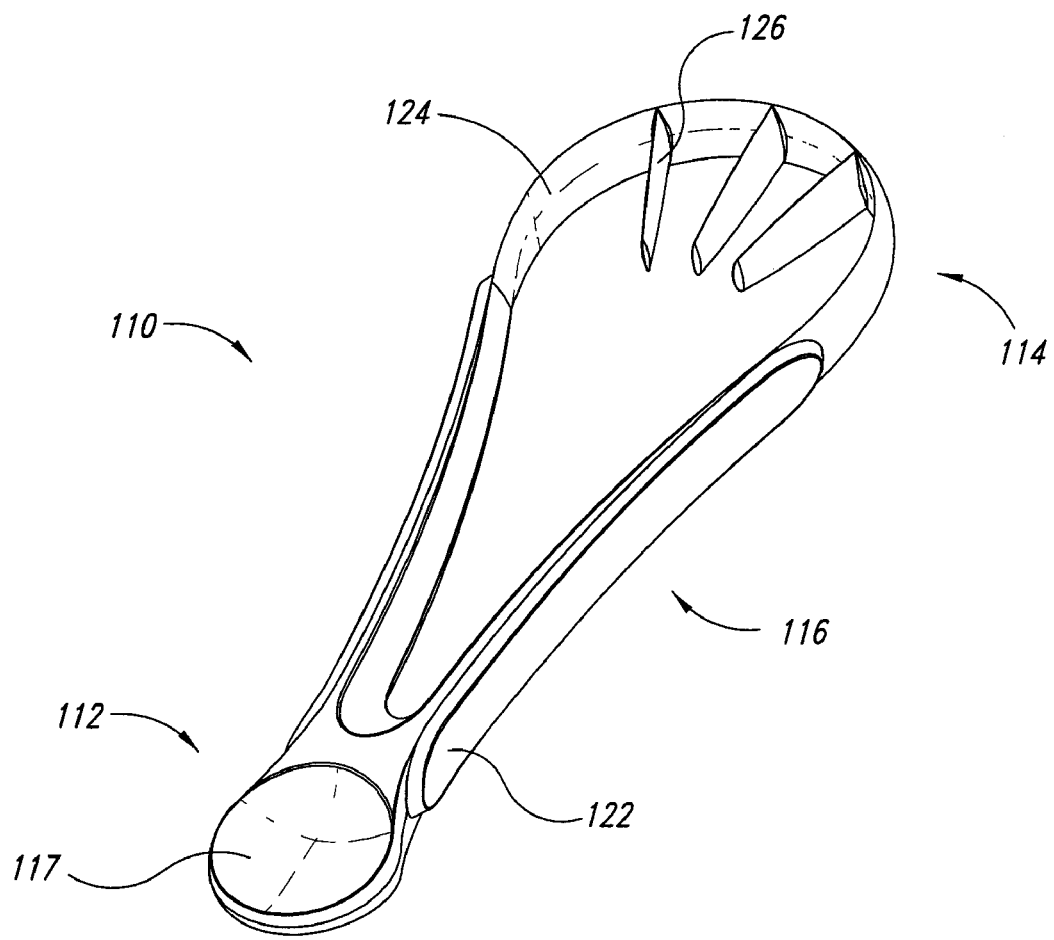
FIG. 5 is an isometric view of a device for removing the meat from a piece of fruit, according to an alternate embodiment of the present invention.

FIG. 5 illustrates one particular embodiment of a device for scooping the meat from a papaya, and for simultaneously slicing the meat. The device 110 has a handle portion 112, a working end 114 and a pair of lateral extensions 116, and can be fabricated in a manner similar to the embodiment described above. The handle portion 112 in the illustrated embodiment has at its terminal end a scoop 117 on one or both sides. The scoop 117 is adapted to scrape the seeds from inside the papaya. The handle portion 112 and lateral extensions each have a resilient grip 122 on each outer edge. In this embodiment, the grip 122 does not extend around the terminal end of the handle portion 112. The handle portion 112 is otherwise the same as that described above.

The working end 114 incorporates a blade 124 and several teeth 126. The blade 124 is adapted to pass through the meat of a papaya relatively easily. The teeth 126 are sufficiently long to cut the entire thickness of a portion of papaya as the device 110 passes through the meat. In the illustrated embodiment, the device 110 has three teeth 126, to cut half a papaya into four roughly equal sections; however, the number and spacing—and even the existence—of the teeth can be changed as desired. The illustrated working end 114 is otherwise essentially the same as the working end described above in connection with the previous embodiment.

The invention claimed is:

1. A device for use in removing a meat of a piece of fruit from a skin of the piece of fruit after the meat has been exposed, the device comprising:
 a handle portion adapted to allow an individual to manually manipulate the device using one hand; and
 a working portion having an elongated blade and a pair of lateral extensions coupling opposing ends of the elongated blade to the handle portion a part of the handle portion overlapping at leastone of the lateral extentions, the elongated blade having a cross-sectional shape adapted to facilitate movement of the elongated blade through the meat of the fruit, the working portion having a resting configuration in which the elongated blade has a first radius of curvature, at least one of the lateral extensions being manipulable under a direct manual force during use to deform the working portion from the resting configuration to a displaced configuration in which the elongated blade has a second radius of curvature, one of the lateral extension being sufficiently proximate the other of the lateral extensions to allow the individual to selectively conform the curvature of the elongated blade to the curvature of the skin, using the one hand, before and as the elongated blade moves through the meat of the fruit, the working portion comprising a resilient material such that, when the manual force is removed from the at least one lateral extension, the working portion will automatically return to the resting configuration.

2. The device of claim 1 wherein the handle portion is unitary with the working portion.

3. The device of claim 1 wherein the handle portion is unitary with the working portion, and wherein the device comprises a polymeric material.

4. The device of claim 1 wherein the handle portion is unitary with the working portion, and wherein the device comprises a resilient polymeric material.

5. The device of claim 1 wherein the elongated blade is unitary with the lateral extensions.

6. The device of claim 1 wherein the elongated blade and the lateral extensions have a constant cross-sectional shape.

7. The device of claim 1 wherein the elongated blade has a cross-sectional shape elongated in a cutting direction.

8. The device of claim 1 wherein the elongated blade has a cross-sectional shape elongated in a cutting direction and terminating in opposing edges, at least edge being pointed.

9. The device of claim 1 wherein the elongated blade has a cross-sectional shape comprising two opposing surfaces terminating in opposing edges, at least one of the opposing surfaces being curved.

10. The device of claim 1 wherein the elongated blade is formed to maintain the first radius of curvature when unstressed.

11. The device of claim 1 wherein the elongated blade comprises a resilient material.

12. The device of claim 1 wherein at least one of the lateral extensions comprises a resilient material.

13. The device of claim 1 wherein both of the lateral extensions comprises a resilient material.

14. The device of claim 1 wherein at least one of the lateral extensions is bendable under a manual force during use to deform the working portion from the resting configuration to the displaced configuration.

15. The device of claim 1 wherein at least one of the lateral extensions is bendable under a manual force during use to deform the working portion from the resting configuration to the stressed configuration and is sufficiently resilient to automatically return the working portion to displaced resting configuration.

16. The device of claim 1 wherein at least one of the lateral extensions is bendable under a manual force during use to deform the working portion from the resting configuration to the displaced configuration, and wherein the elongated blade is sufficiently resilient to automatically return the working portion to the resting configuration.

17. The device of claim 1 wherein at least one of the lateral extensions is bendable under a manual force during use to deform the working portion from the resting configuration to the displaced configuration, and wherein the elongated blade and the at least one lateral extension are sufficiently resilient to automatically return the working portion to the resting configuration.

18. The device of claim 1 wherein the second radius of curvature is different than the first radius of curvature.

19. The device of claim 1 wherein the second radius of curvature is smaller than the first radius of curvature.

20. A device for use in removing a meat of a piece of fruit from a skin of the piece of fruit after the meat has been exposed, the device comprising:
    a handle portion adapted to allow an individual to manually manipulate the device;
    a working portion having an elongated blade and a pair of lateral extensions coupling opposing ends of the elongated blade to the handle portion, the elongated blade having a cross-sectional shape adapted to facilitate movement of the elongated blade through the meat of the fruit, the working portion having a resting configuration in which the elongated blade has a first radius of curvature, at least one of the lateral extensions being manipulable under a manual force during use to deform the working portion from the resting configuration to a displaced configuration in which the elongated blade has a second radius of curvature, to allow the individual to selectively conform the curvature of the elongated blade to the curvature of the skin before and as the elongated blade moves through the meat of the fruit, the working portion comprising a resilient material such that, when the manual force is removed from the at least one lateral extension, the working portion will automatically return to the resting configuration; and
    a plurality of spaced apart teeth coupled to the elongated blade.

21. The device of claim 20 wherein the plurality of spaced apart teeth project transversely from the blade.

22. The device of claim 20 wherein the plurality of spaced apart teeth project transversely inward from the blade.

* * * * *

UNITED STATES PATENT AND TRADEMARK OFFICE
CERTIFICATE OF CORRECTION

| | | |
|---|---|---|
| PATENT NO. | : 7,080,454 B2 | Page 1 of 1 |
| APPLICATION NO. | : 10/710407 | |
| DATED | : July 25, 2006 | |
| INVENTOR(S) | : David A. Holcomb et al. | |

It is certified that error appears in the above-identified patent and that said Letters Patent is hereby corrected as shown below:

Column 4
Line 61, "leastone" should read as --least one--.

Column 5
Line 30, "least edge" should read as --least one edge--.
Line 53, "displaced resting configuration" should read as --displaced configuration--.

Signed and Sealed this

Thirty-first Day of March, 2009

JOHN DOLL
*Acting Director of the United States Patent and Trademark Office*